(12) United States Patent
Zhang et al.

(10) Patent No.: US 8,676,195 B2
(45) Date of Patent: Mar. 18, 2014

(54) FIXED MOBILE ROAMING SERVICE SOLUTION

(75) Inventors: David Xining Zhang, San Jose, CA (US); Huixue Xu, Beijing (CN); Xaiojun Ma, Haidian district Bejing (CN); Richard Haichen Xu, San Jose, CA (US)

(73) Assignee: Aicent, Inc., San Jose, CA (US)

( * ) Notice: Subject to any disclaimer, the term of this patent is extended or adjusted under 35 U.S.C. 154(b) by 52 days.

(21) Appl. No.: 11/787,499

(22) Filed: Apr. 16, 2007

(65) Prior Publication Data

US 2007/0254648 A1    Nov. 1, 2007

Related U.S. Application Data

(60) Provisional application No. 60/792,165, filed on Apr. 14, 2006.

(51) Int. Cl.
*H04Q 7/20* (2006.01)

(52) U.S. Cl.
USPC ............. 455/433; 455/435.1; 455/435.2; 455/436; 455/437; 455/439; 370/331; 370/338; 370/328; 370/340; 370/351; 370/466; 370/467

(58) Field of Classification Search
USPC ......... 370/352, 353, 355, 356, 363, 365, 373, 370/377, 384, 386, 331, 347, 358, 466; 455/435.1, 432.1, 433, 428, 432.3
See application file for complete search history.

(56) References Cited

U.S. PATENT DOCUMENTS

| | | | |
|---|---|---|---|
| 6,308,267 B1 * | 10/2001 | Gremmelmaier | 713/168 |
| 6,512,448 B1 | 1/2003 | Rincon et al. | |
| 7,065,340 B1 | 6/2006 | Einola | |
| 7,359,704 B1 * | 4/2008 | Dizdarevic et al. | 455/435.1 |
| 7,787,600 B1 | 8/2010 | Bari | |
| 2002/0112014 A1 | 8/2002 | Bennett et al. | |
| 2002/0187777 A1 * | 12/2002 | Osterhout et al. | 455/417 |
| 2002/0191575 A1 | 12/2002 | Kalavade et al. | |
| 2003/0172121 A1 | 9/2003 | Evans et al. | |
| 2003/0214958 A1 | 11/2003 | Madour et al. | 370/401 |
| 2004/0005886 A1 * | 1/2004 | Oda et al. | 455/422.1 |
| 2004/0205205 A1 | 10/2004 | Patterson | |
| 2004/0248547 A1 | 12/2004 | Philsgard et al. | |

(Continued)

OTHER PUBLICATIONS

FMC: A Driving Trend "Pipeline", by Daniela Bendor, OutSmart, North America, 2 pages.

(Continued)

*Primary Examiner* — Ajit Patel

*Assistant Examiner* — Fred Casca

(74) *Attorney, Agent, or Firm* — Haverstock & Owens LLP

(57) ABSTRACT

The present invention is directed to systems for and methods of using dual mode handsets or softphone client for voice, sms, and data services. In one embodiment of the present invention, a mobile handset uses a SIP User Agent to register on a visiting network. The mobile handset generates SIP REGISTER messages. The SIP REGISTER messages are translated into corresponding MAP registration (or RADIUS message) and authentication commands, allowing system to contact the HPLMN HLR (or home AAA) associated with the mobile device to authenticate the mobile device and register it on a VLR of a visiting network. MAP responses (or RADIUS response) are translated to corresponding SIP commands that are forwarded to the mobile device, thereby completing the connection set up.

17 Claims, 9 Drawing Sheets

(56) References Cited

U.S. PATENT DOCUMENTS

| | | |
|---|---|---|
| 2004/0266462 A1 | 12/2004 | Chava et al. |
| 2005/0144243 A1 | 6/2005 | Cheng |
| 2005/0177733 A1 | 8/2005 | Stadelmann et al. |
| 2005/0220139 A1* | 10/2005 | Aholainen ............. 370/466 |
| 2006/0251008 A1* | 11/2006 | Wu et al. ............. 370/328 |
| 2007/0019580 A1* | 1/2007 | Zhang et al. ............. 370/315 |
| 2007/0019623 A1* | 1/2007 | Alt et al. ............. 370/352 |
| 2007/0117577 A1* | 5/2007 | Harris ............. 455/466 |
| 2007/0183363 A1* | 8/2007 | Liden ............. 370/331 |
| 2007/0186106 A1 | 8/2007 | Ting et al. |
| 2007/0208936 A1 | 9/2007 | Ramos Robles |
| 2008/0077789 A1 | 3/2008 | Gondo |
| 2008/0260149 A1 | 10/2008 | Gehrmann |
| 2009/0059874 A1 | 3/2009 | Carter |
| 2009/0094680 A1 | 4/2009 | Gupta et al. |
| 2009/0205028 A1 | 8/2009 | Smeets et al. |
| 2009/0221265 A1 | 9/2009 | Liu et al. |
| 2010/0146262 A1 | 6/2010 | Zhang |
| 2010/0232407 A1 | 9/2010 | Navali et al. |
| 2011/0007705 A1 | 1/2011 | Buddhikot et al. |
| 2011/0041167 A1 | 2/2011 | Nguyen |
| 2011/0047603 A1 | 2/2011 | Gordon et al. |
| 2011/0154454 A1 | 6/2011 | Frelechoux |
| 2011/0165896 A1 | 7/2011 | Stromberg et al. |
| 2011/0277019 A1 | 11/2011 | Pritchard, Jr. |

OTHER PUBLICATIONS

MobileIgnite Program—FAQ, www.mobileignite.org/news/pr_012506.html, 2 pages, Jan. 25, 2006.

MobileIgnite, Voice Call Handover Service: Functional Specification, Version 1.0, Sep. 21, 2006, 52 pages.

Foreign Office Action dated Jul. 9, 2010, Singapore Application No. 200807548-3, filed Apr. 16, 2007, Aicent, Inc.

Examination Report dated May 10, 2010, from the Intellectual Property Office, Reference No. P035258GB JDV. Application No. GB0820821.7, Applicant: Aicent, Inc., 2 pages.www.ipo.gov.

International Search report dated Jul. 10, 2012, International Application No. PCT/US2011/61395, Intl. Filing Date: Nov. 18, 2011, 14 pages.

International Search Report dated Jul. 10, 2012, International Application No. PCT/US2012/30986, Intl. Filing Date: Mar. 28, 2012, 12 pages.

Bartvai, E., Austrian Patent Office, Written Opinion mailed Sep. 29, 2009 for Singapore Patent Application No. 200807548-3, 4 pages.

\* cited by examiner

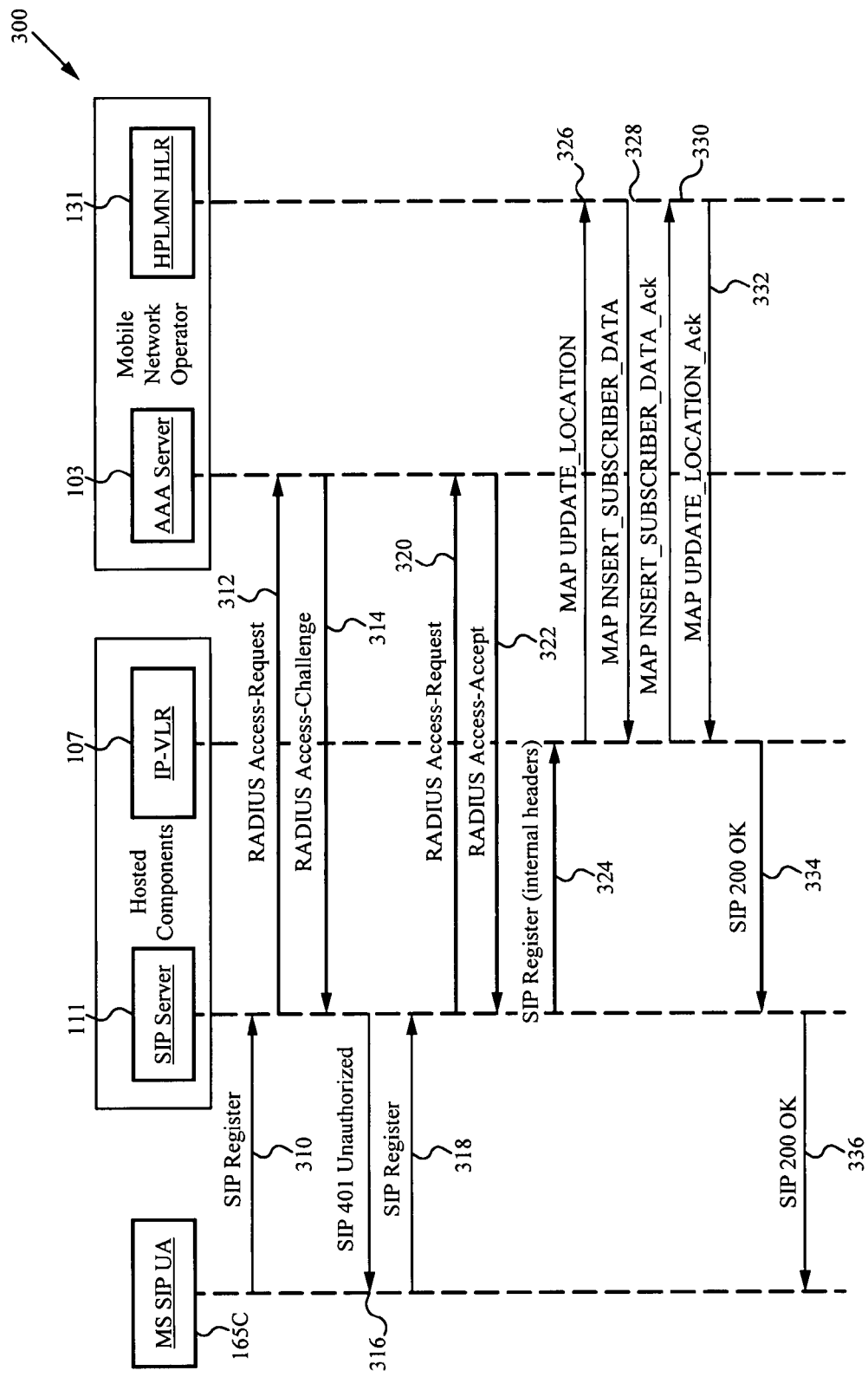

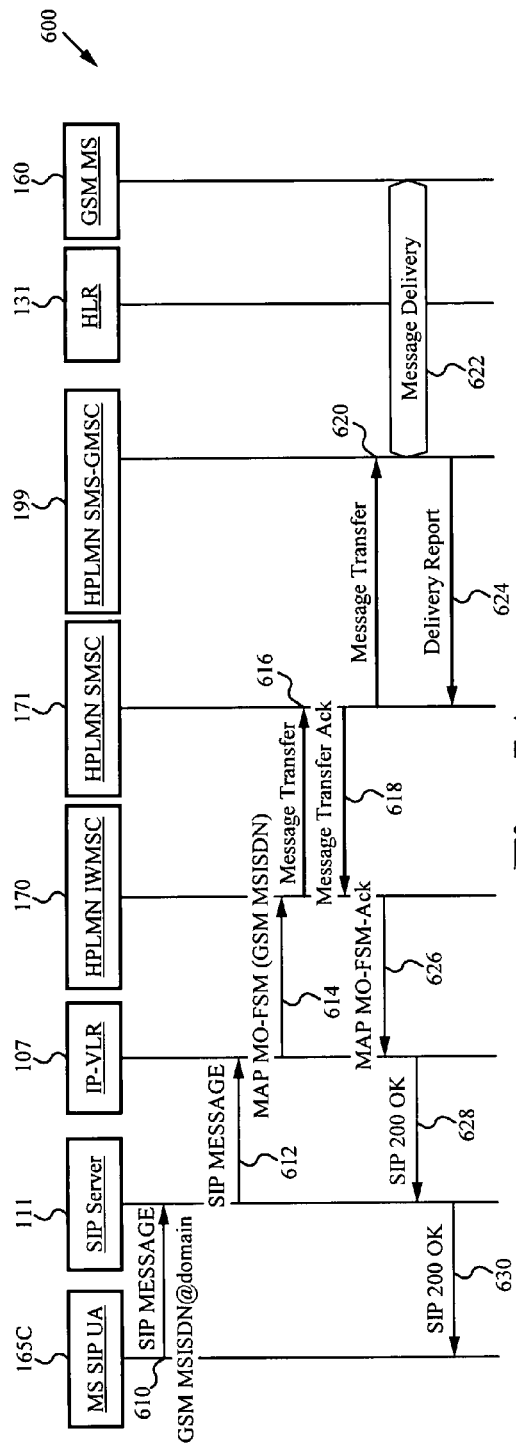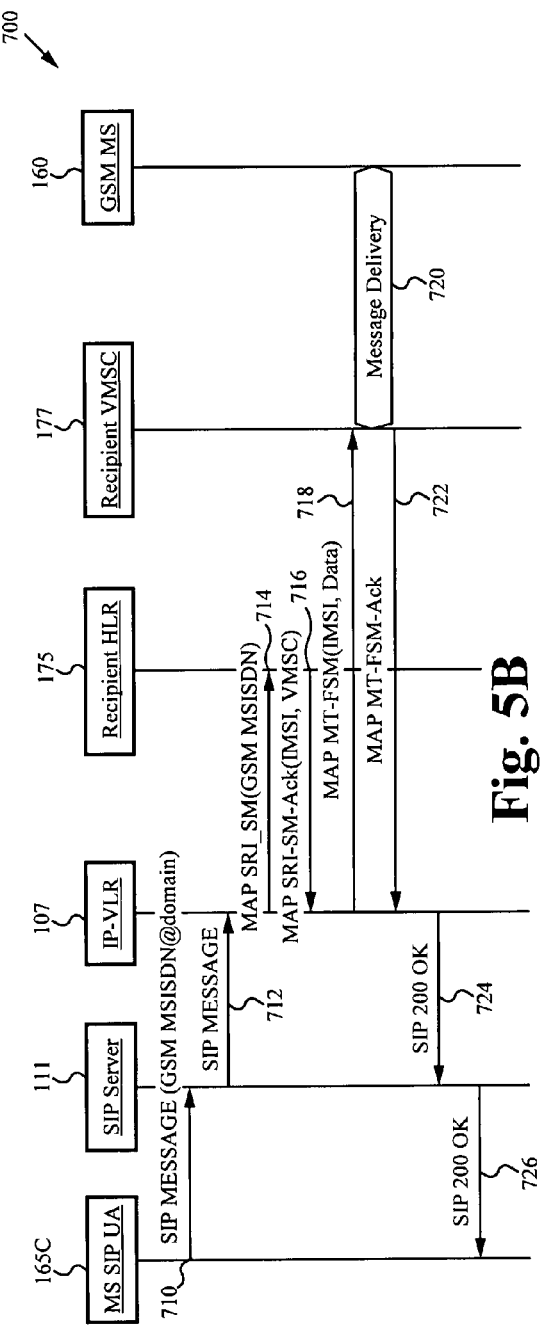
Fig. 5A
Fig. 5B

FIXED MOBILE ROAMING SERVICE SOLUTION

RELATED APPLICATION

This patent application claims priority under 35 U.S.C. §119(e) of the U.S. provisional patent application Ser. No. 60/792,165, filed Apr. 14, 2006, and titled "FIXED MOBILE ROAMING SERVICE FRAMEWORK," which is hereby incorporated by reference.

FIELD OF THE INVENTION

The present invention relates to mobile telephones and other services. More specifically, the present invention relates to roaming or other services provided by mobile operators and/or fixed line operators to allow their end users to use dual mode handsets or softphone client at PC with a same mobile phone number for voice/sms/data services.

BACKGROUND OF THE INVENTION

The bulk of revenue earned by mobile communications is generated by voice traffic. A large share of that revenue is generated by roaming charges, which are incurred when a mobile phone cannot access the network to which it is registered and must access a different network. Mobile operators are assessed these roaming charges, such as Inter Operator Tariffs and Inter Exchange Carrier fees, which are ultimately passed on to the consumer.

To reduce these fees, mobile phone users take a variety of steps, such as using their mobile phones outside their registered network coverage area less often or changing Subscriber Identity Module (SIM) cards. When any of these steps are taken, the revenue generated by mobile operators is reduced and users are inconvenienced.

These drawbacks are also found with mobile telephones and other devices configured for Fixed Mobile Convergence (FMC). Such devices are able to access both fixed telephone networks, using wireless local area networks (WLAN), and mobile phone networks, using cellular networks, such as GSM or CDMA. These devices are not, however, capable of seamless roaming from one network into another for both voice and Short Message Service (SMS) messaging. Furthermore, there are no systems capable of authenticating, authorizing, and billing these devices as they roam using voice and SMS messages. Because users are similarly inconvenienced, unable to roam while exchanging voice and SMS messages, mobile operators suffer accordingly.

SUMMARY OF THE INVENTION

The present invention provides a platform and solution to enable dual-mode mobile station (also called "mobile phone" or "mobile handset") to receive/make voice and SMS communications with the same MSISDN in GSM using SIP-based technology. The dual-mode mobile station contains the interfaces of GSM and WiFi (or WiMax, or any IP Mobile Station). This platform and solution can also be used for CDMA-based dual-mode mobile station (CDMA and WiFi) environments.

Embodiments of the invention contain a platform that includes an IP-VLR, a SIP Server, a AAA server, a Billing Server, a Reporting Server, a CDR mediation and Financial Settlement Server, a Trunk Gateway, a Signaling Gateway, as well as the SIM-based SIP User Agent (UA). Embodiments can be implemented as a $3^{rd}$ party service offering, or as added infrastructure to a mobile operator, fixed line operator or Mobile Virtual Network Operator (MVNO).

In a first aspect of the present invention, a method of registering a mobile device to use a visiting network includes translating first registration messages from the mobile device from a first protocol to corresponding second registration messages in a second protocol, and transmitting the second registration messages to register the device to use the visiting network. In one embodiment, the method also includes translating response messages in the second protocol to corresponding response messages in the first protocol and transmitting the corresponding response messages in the first protocol to the mobile device. Preferably, the first protocol is Session Initiation Protocol (SIP) and the second protocol is a global wireless protocol, such as Mobile Application Part (MAP).

In one embodiment, the method also includes retrieving from the mobile device an International Mobile Station Identity (IMSI) and transmitting the IMSI in the first registration messages.

Translating the first registration messages into the second registration messages is performed at an Internet Protocol Visitor Location Register (IP-VLR).

In one embodiment, the method also includes authenticating the mobile device through a Home Public Land Mobile Network (HPLMN) Home Location Register (HLR) using the second protocol. Authentication and location information for the mobile device are exchanged between the HPLMN HLR and the IP-VLR. In another embodiment, the mobile device is authenticated using an authentication sequence with a proxy server using a third protocol, such as Remote Authentication Dial-In and User Service (RADIUS). Alternatively, the method also includes retrieving an authentication sequence from the mobile device.

In one embodiment, the method also includes sending a Short Message Service Message from the mobile device to a destination device.

In a second aspect of the present invention, a method of establishing a call between a first mobile device and a second device includes reading from the first mobile device a mobile subscriber Integrated Services Digital Network (ISDN) number; translating the ISDN number into a mobile station roaming number (MSRN); connecting to a gateway associated with the destination mobile phone using the MSRN; and accessing the second device using the gateway. Preferably, the second device is accessed using SIP and connecting to a gateway comprises a signaling protocol, such as Signal Switching 7, ISDN User Part, Telephone User Part, or Q.931.

Preferably, the first mobile device comprises a SIP User Agent.

In one embodiment, the method also includes transmitting domain information corresponding to the first mobile device from the SIP User Agent to a SIP Server, and transmitting SIP messages indicating the domain to an IP-VLR. The method also includes transmitting the domain information to an HLR and receiving from the HLR an International Mobile Station Identity (IMSI) corresponding to the mobile device.

In a third aspect of the present invention, a managed network includes a hub programmed to control a connection for sending a Short Message Service (SMS) message from a mobile device, wherein the hub is programmed to exchange first call control messages with the mobile device using a first protocol and to exchange corresponding second call control messages with a transmission component using a second protocol. The hub includes a SIP server and the first protocol is SIP. Preferably, the hub includes an Internet Protocol Visitor Location Register (IP-VLR) coupled to the SIP server and programmed to translate between the first call control messages and the second control messages. The IP-VLR is coupled to a Home Location Register (HLR) and programmed to transmit location information for the mobile device to the HLR.

In one embodiment, the SIP Server is programmed to exchange the second control messages with an authentication server using the second protocol and the IP-VLR is programmed to exchange corresponding third call control messages with the HLR.

In one embodiment, the hub includes a trunk gateway coupling the SIP Server to a Home Public Land Mobile Network (HPLM) Gateway Mobile Switching Center (GMSC). The second protocol is a global networking protocol, such as Mobile Application Part (MAP) protocol.

The second call control messages correspond to updating a location of the mobile device on the HLR and authenticating the mobile device on an authentication server.

In one embodiment, the hub also includes a proxy authentication server that is programmed to authorize the mobile device to perform predetermined tasks and to bill the mobile device for services. The SIP server is programmed to exchange the second call control messages with the authentication server and the IP-VLR is programmed to exchange corresponding third call control messages with the HLR using a third protocol.

In one embodiment, the first protocol is SIP, the second protocol is Remote Authentication Dial-In User Service (RADIUS), and the third protocol is MAP. Preferably, the first call control messages include a MSISDN of a mobile device. Alternatively, the first call control messages comprise a domain name corresponding to the MSISDN.

In a fourth aspect of the present invention, a method of providing Short Message Service (SMS) services between a Global System for Mobile Communications/Mobile Application Part (GSM/MAP) domain and Session Initiation Protocol/Internet Protocol (SIP/IP) domain includes providing a SIP interface for SMS communication with a SIP User Agent in IP mode; reading a Home SMS Center (SMSC) global title address by the SIP User Agent; providing a MAP interface for communicating with the SMSC of a Home Public Land Mobile Network (HPLMN) used to serve a subscriber in a traditional GSM network; converting a body of a SIP Message generated by the SIP User Agent into a MAP MO-FSM message; forwarding the MAP MO-FSM message to the SMSC; and converting the MAP response into corresponding SIP response messages, thereby informing the SIP User Agent of the submission result. The method also includes mapping between a GSM character set and one of ASCII and UTF-8. The title address is configured and stored in a Subscriber ID module of a mobile device. The method also includes reading the address by the SIP User Agent, and transmitting the address to a SIP Server in real time when a short message is exchanged in the SIP message. Alternatively, the address is transmitted to a SIP Server during a SIP REGISTER operation.

In a fifth aspect of the present invention, a method of providing SMS interworking between a GSM/MAP domain and a SIP/IP domain includes providing a SIP interface for SMS communication with a SIP User Agent in IP mode; providing a Mobile Application Part (MAP) interface for communication with a Home Location Register (HLR) and SMS-GMSC of a traditional GSM network; converting a body of a SIP Message into a MAP SRI-For-SM and MT-FSM messages; forwarding the MAP message to the GMSC; converting the MAP response into a corresponding SIP response to inform the SIP UA of a result; and mapping between GSM characters and one of ASCII and UTF-8.

In a sixth aspect of the present invention, a method of providing SMS interworking between a GSM/MAP domain and a SIP/IP domain includes providing a MAP interface for communicating with an HLR and a SMS-GMSC in a traditional GSM network; providing a SIP interface for SMS communication with a SIP User Agent in IP mode; converting a MAP MT-FSM message into a SIP MESSAGE; forwarding the SIP Message to the SIP User Agent; converting a SIP response from the SIP User Agent into a corresponding MAP response to inform the SMSC of a result; and mapping characters between a GSM character set and one of ASCII and UTF-8.

In a seventh aspect of the present invention, a method of providing a roaming number for a voice call to a dual-mode mobile station/softphone in IP mode, includes providing a MAP interface for communication with an HLR in a traditional GSM network; providing a SIP interface for communication with a SIP User Agent in IP mode; providing a SS7 interface for communication with a GMSC for voice call setup; allocating a temporary Roaming Number for a MAP PRN request from the HLR; storing the IMSI and MSRN in a mapping table; converting a voice call setup message into a SIP INVITE message; determining the IP and Port information of the SIP UA that is using the MSISDN; and forwarding the SIP INVITE to the address. An IMSI-MSRN mapping table and an IMSI-MSISDN mapping table are used to convert the MSRN in a SS7 setup message into the MSISDN in a SIP INVITE request URI. The call set up message is one of ISUP IAM and Q.931 Setup.

BRIEF DESCRIPTION OF THE DRAWINGS

FIG. 3 is a detailed signaling call-flow of authentication and registration for AAA-based dual-mode (cellular and WiFi or WiMax), in accordance with the present invention, in which AAA can be deployed at either a GSM- or CDMA-based cellular network.

FIG. 5A is a detailed call-flow of one of the options for an SMS message originating from a dual-mode mobile station in an IP mode to a terminating GSM Mobile Station, in accordance with the present invention, in which an IP-VLR uses MO-FSM to submit messages from a GSM MS thorough an HPLMN's SMSC.

FIG. 5B is a detailed call-flow of another option for an SMS message originating from a dual-mode mobile station in an IP mode to a terminating GSM Mobile Station, in accordance with the present invention, in which an IP-VLR uses MT-FSM to submit messages from a GSM MS without going through an HPLMN's SMSC.

LIST OF ACRONYMS

The following lists the acronyms used throughout this Specification.

| | |
|---|---|
| AAA | Authentication, Authorization, Accounting |
| CAP | CAMEL Application Part |
| CDMA | Code Division Multiple Access |
| CDR | Call Detail Record |
| GMSC | Gateway MSC |
| GSM | Global System for Mobile Communications |
| HPLMN | Home Public Land Mobile Network |
| HLR | Home Location Register |
| IAM | Initial Address Message |
| IMSI | International Mobile Subscriber Identity |
| ISDN | Integrated Services Digital Network |
| ISUP | ISDN User Part |
| IMSI | International Mobile Subscriber Identity |
| MAP | Mobile Application Part |
| MO-FSM | Mobile Originated-Forward Short Message (MAP Message) |
| MSC | Mobile Switching Center |
| MS | Mobile Station |
| MSISDN | Mobile Station Integrated Services Digital Network |
| MSRN | Mobile Station Roaming Number |
| MT-FSM | Mobile Terminated-Forward Short Message (MAP Message) |
| MVNO | Mobile Virtual Network Operator |
| PC | Personal Computer |
| PRN | Provide Roaming Number (MAP Message) |
| PSTN | Public Switched Telephone Network |
| RADIUS | Remote Authentication Dial-In User Service |
| SCP | Service Control Point |
| SIM | Subscriber Identity Module |
| SIP | Session Initiation Protocol |
| SIP UA | SIP User Agent |
| SMS | Short Message Service |
| SMSC | Short Message Service Center |
| SRI | Send Routing Information (MAP Message) |
| SRI-For-SM | Send Routing Information-For-Short Message (MAP Message) |
| STP | Signaling Transfer Point |
| TDMA | Time Division Multiple Access |
| TG | Trunk Gateway |
| UA | User Agent |
| VLR | Visitor Location Register |
| VMSC | Visited Mobile Switching Center |

DETAILED DESCRIPTION OF THE INVENTION

The present invention provides a platform and solution to enable dual-mode mobile stations (also called mobile phones or mobile handsets) or softphone client to receive/make voice and SMS communications with the same MSISDN in GSM using SIP-based technology, where the dual-mode mobile station contains the interfaces of GSM and WiFi (or WiMax, or any IP Mobile Station). This platform and solution can also be used for CDMA-based dual-mode mobile station (CDMA mode and WiFi mode) environment.

Embodiments of the present include a platform with an IP-VLR, a SIP Server, an AAA Proxy server, a Billing and Reporting server, a CDR mediation and Financial Settlement server, a Trunk Gateway, a Signaling Gateway, as well as the SIP-based SIP UA. Embodiments are able to be implemented as a $3^{rd}$ party service offering, or as added infrastructure to mobile operator, fixed line operator or MVNO.

Figure 1:
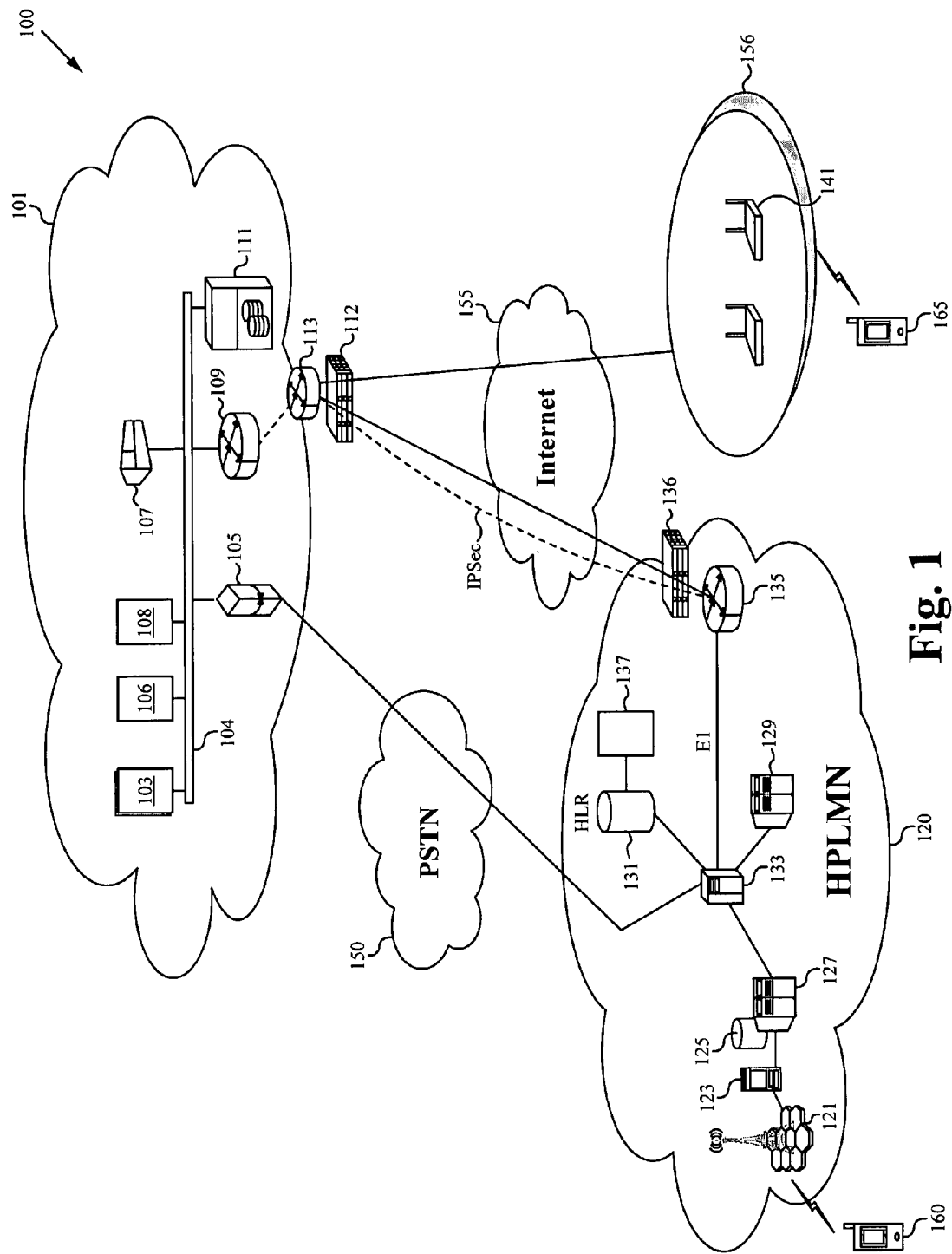
FIG. 1 is the service roaming architecture with the fixed-mobile roaming platform, in accordance with the present invention.

FIG. 1 is a schematic diagram illustrating an exemplary distributed network communication system, including a Managed IP network 101 that contains the roaming service platform, a PSTN network 150, the Internet 155 access, a Home PLMN network 120 and a WLAN (WiFi, WiMax or IP) network 156.

The Managed IP network 101 can be implemented and managed by GRX/IPX (GPRS Roaming eXchange/IP eXchange) service provider, an IP backbone provider, or a mobile operator. The managed IP network 101 provides high QoS and secured network interconnecting with mobile operator and any telecommunication carriers for both signaling traffic and voice media traffic. The Managed IP network 101 includes the SIP Gateway 111, the IP-VLR 107, an AAA Proxy Server 103, a CDR Server 106, a Billing Server 108, a Trunk Gateway 105, a Signaling Gateway 109, a Router 113, and a Firewall 112.

The SIP Gateway 111, sometimes also called a SIP Server, keeps the domain information in either realm based such as network.com or MNC.MCC, and acts as a registrar server for the SIP User Agent that is located in the WiFi Network 156. The SIP Gateway 111 uses the domain information received from the dual-mode mobile station 165 to find a home HLR 131 address. Further the SIP Gateway 111 acts as a proxy server to exchange the authentication messages between a SIP User Agent installed at the dual-mode mobile station 165 and the home HLR 131 if SIM-based authentication is required with the help of IP-VLR 107. If the home operator requires AAA based authentication instead of SIM-based authentication, the SIP Gateway 111 generates AAA authentication request messages and forwards them to the AAA Proxy Server 103, which proxies the messages to the home AAA server 137 within the home operator's network.

The IP-VLR 107 functions as a virtual MSC/VLR, with location information of the dual-mode mobile station or soft phone. It can be virtually viewed as the home operator MSC/VLR or a roaming partner's MSC/VLR. It supports 2 protocols, one is SIP protocol to interface with the SIP Gateway 111, whose bearer layer protocol is IP based; the other is the MAP protocol to interface with the home HLR 131, whose bearer layer protocol is SS7 based.

The Trunk Gateway 105 is used as the media gateway to convert the bear traffic from MSC into VoIP media type, or vice versa.

The Call Detail Record (CDR) Server 106 is used to collect the CDR from both IP-VLR 105 and the SIP Gateway 111 and the Billing Server 108 validates the CDR, adds tariffs and then sends the total to a settlement engine for financial credit/debit (settlement) calculation, where the settlement engine can be a separate unit as backend operating support system.

The dual mode mobile station 165 can wirelessly communicate in the Wi-Fi network 156 via Access Points (APs) 141. Each AP 141 provides service to a geographic region known as a hotspot, and is assigned a network address such as an Internet protocol (IP) address. Each AP 141 also includes wired communications capabilities, such as Ethernet capabilities, to connect to the Internet 155. The dual mode mobile station 165 is installed with the software SIP User Agent, which is capable of support the SIP protocol to generate voice call and message exchange with the others through SIP servers.

The SIP User Agent has the capability to retrieve the IMSI information that is stored in the SIM card, as normally contained in a GSM mobile station. The SIP User Agent also has the capability to fetch a SIM's processing result with challenged requests in order to provide SIM-based authentication from the SIP Gateway 111. Once the challenge is verified, the SIP User Agent registers on the SIP Gateway 111 which further updates the phone number's location information into the home HLR 131 via a SS7 network connection.

The SIP User Agent can also be installed as soft client on various types of devices, such as a portable computer, a personal digital assistant (PDA), an Internet appliance, or other wired or wireless devices. If such devices do not have the SIM module to host the SIM card and then to provide SIM-based authentication, the SIP User Agent can utilize the AAA based authentication, in which a username plus password are encrypted through the AAA packet. Normally the user name is combined with a phone number and the mobile operator's domain name. Based on the domain name in the SIP REGISTER message, the SIP Gateway challenges the SIP User Agent, then generates AAA packets with the authentication credentials, and sends it to the corresponding home operator's AAA Server 137. This method can also be used for CDMA-based dual-mode mobile station (CDMA mode and WiFi mode).

The SIP User Agent can also send/receive short messages.

SIM-Based Authentication and Location Update

SIM-Based Authentication leverages SIP message flows to carry the mobile subscriber's identity, which is stored in the SIM card, including IMSI, Ki(integrity key). The SIP Messages also carry Rand, CKSN, SRes that are used for challenging the mobile station like a regular GSM SIM authentication sequence.

Figure 2:
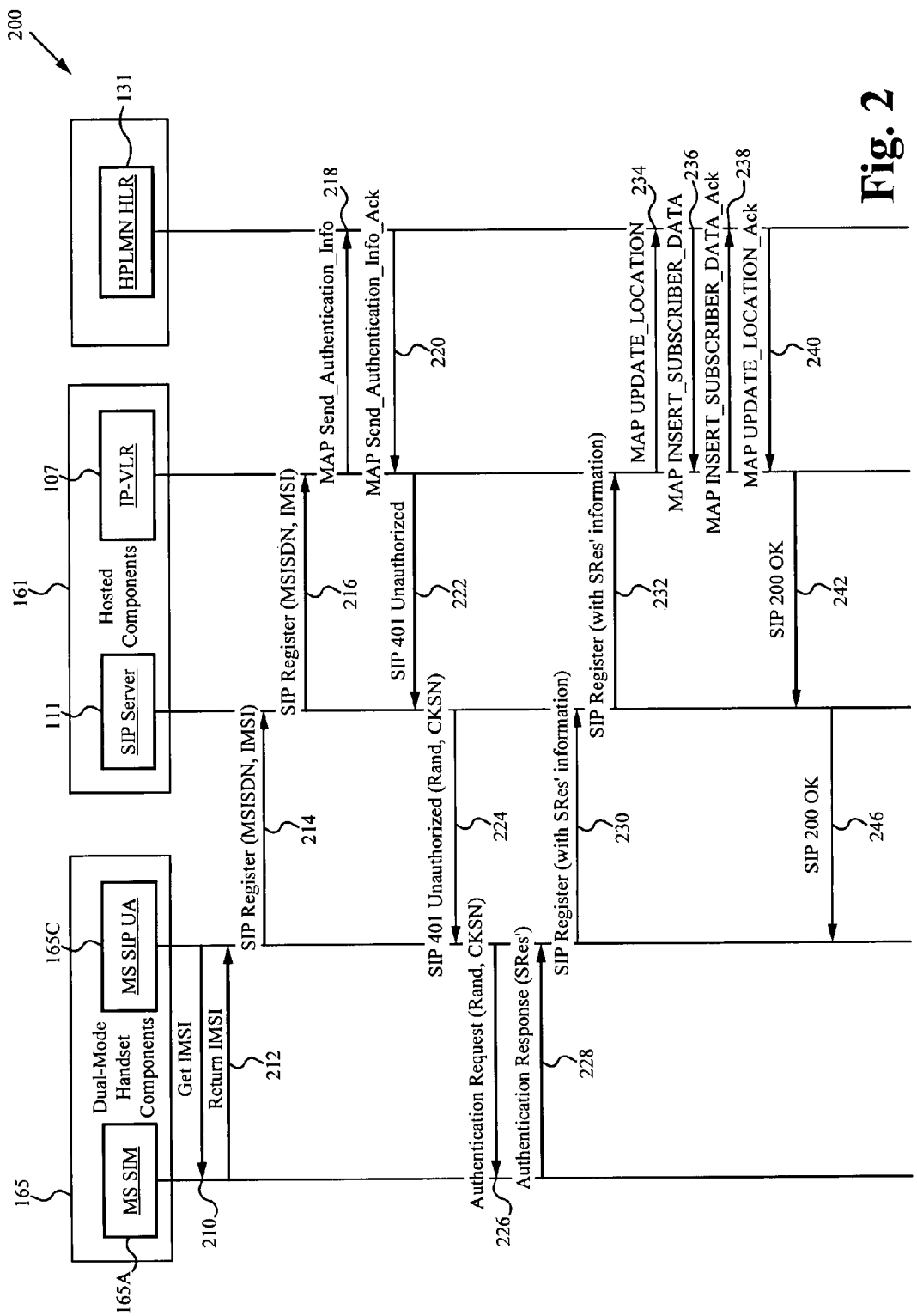
FIG. 2 is a detailed signaling call-flow of authentication and registration for a SIM-based dual-mode (cellular and WiFi or WiMax), in accordance with the invention, in which SIM is used at a GSM-technology-based cellular network.

The detailed signaling authentication and registration flow for GSM-based dual-mode mobile station is shown in FIG. 2. Throughout this Specification, identically labeled elements refer to the same element. MS SIP UA 165c at the dual mode mobile station 165 gets the IMSI information through the internal interface with MS SIM Module 165A at the same handset. Then the MS SIP UA 165C generates a SIP REGISTER request 214 to the SIP Gateway 111 according to the domain or IP address that are configured in the profile of the handset. The IMSI information is carried in the SIP message using certain message headers or parameters, as currently there is no standard specification to define the IMSI information over SIP. The SIP Gateway 111 communicates the information to IP-VLR 107 by using the SIP message 216 with non-standard parameter or by using private API. Those skilled in the art will recognize when that labels (e.g., 216) are able to refer to messages, steps shown in the figures, or both.

Then the IP-VLR 107 carries out the MAP Authentication Process through the MAP protocol to the home operator's HLR 131. On getting the authentication challenge from HLR 131, the IP-VLR 107 forwards the triplets (Rand, CKSN, SRes) to the SIP Gateway 111 through non-standard SIP response or private API. Next, the SIP Gateway 111 generates a SIP "401 Unauthorized" to the SIP UA in dual mode mobile station 165. The SIP "401 Unauthorized" message carries Rand and CKSN from the IP-VLR 107. The MS SIP UA passes the Rand and CKSN to the MS SIM module to calculate the SRes' by using message 226 and 228. Those skilled in the art will know that the SRes' is calculated by running the A3 algorithm with the Ki and Rand as the input parameters.

After getting the SRes' from MS SIM Module 165A, the MS SIP UA generates another SIP REGISTER 230 to the SIP Gateway 111 which contains the challenge response. The SIP Gateway 111 does a comparison between the SRes from IP-VLR and SRes' from SIP UA; if they are equal, then SIP Gateway 111 updates the IP-VLR 107 to perform Location Update by using SIP REGISTER 232.

After successfully performing the Location Update procedure with HPLMN HLR 131, the IP-VLR 107 informs the SIP Gateway 111 of the result through non-standard SIP Message or private API. The SIP Gateway 111 generates SIP "200 OK" to the SIP UA to inform the successful registration result.

TABLE 1

Sample Message 1:

REGISTER sip:test.sip.aicent.com SIP/2.0
Via: SIP/2.0/UDP 192.168.1.101:8340;rport;branch=z9hG4bK2839800813
From: <sip:4083670277@test.sip.aicent.com:5060>;tag=2875120930
To: <sip:4083670277@test.sip.aicent.com:5060>
Call-ID: 652139075@192.168.1.101
CSeq: 16 REGISTER
Contact: <sip:4083670277@192.168.1.101:8339>
Max-Forwards: 70
Expires: 3600
User-Agent: Paragon Wireless PWTW-1100 1.0.6
SN/000b6c378ad2 aisi/454191234567890
Allow: INVITE, ACK, CANCEL, OPTIONS, BYE, REFER, NOTIFY
Content-Length: 0

Referring to sample message 1, "aisi/IMSI Information" is defined in the SIP REGISTER message to carry the IMSI information over SIP. "aisi" is an identifier to show the algorithm in the present invention, IMSI digits is the 15-digit IMSI information retrieved from SIM Module, and encoded with BASE64. Those skilled in the art will recognize other algorithms and encoding schemes that case be used in accordance with the present invention.

TABLE 2

Sample Message 2:

SIP/2.0 401 Unauthorized
Via: SIP/2.0/UDP
192.168.1.101:8340;rport=8340;branch=z9hG4bK2839800813;
received=218.107.160.113
From:
<sip:4083670277@test.sip.aicent.com:5060>;tag=2875120930
To:
<sip:4083670277@test.sip.aicent.com:5060>;tag=2f9e7685c
324443a63ec32da4ae08850.3096
Call-ID: 652139075@192.168.1.101
CSeq: 16 REGISTER
WWW-Authenticate: Digest realm="test.sip.aicent.com",
nonce="448d3c0d0a0e2779a22e820598b41f8aba05bf1d",
algorithm=aisi
Content-Length: 0

Referring to sample message 2, nonce="RAND" and algorithm=aisi in SIP 401 Challenge is defined. RAND is a 128-bit random number (RAND) that is used as the input for A3 algorithm in a SIM card and encoded using BASE64 alogrithm. algorithm=aisi is to identify the algorithm in Sample message 2.

TABLE 3

Sample Message 3:

REGISTER sip:test.sip.aicent.com SIP/2.0
Via: SIP/2.0/UDP
192.168.1.101:8340;rport;branch=z9hG4bK2676214825
From:

TABLE 3-continued

Sample Message 3:

```
        <sip:4083670277@test.sip.aicent.com:5060>;tag=1178912830
To: <sip:4083670277@test.sip.aicent.com:5060>
Call-ID: 652139075@192.168.1.101
CSeq: 17 REGISTER
Contact: <sip:4083670277@192.168.1.101:8339>
Authorization: Digest username="4083670277",
realm="test.sip.aicent.com",
nonce="448d3c105c580d1e69f3192881232c4ab46ed789",
uri="sip:test.sip.aicent.com",
response="0ef9764da28487342d3b02d19936a9dc",
algorithm=aisi
Max-Forwards: 70
Expires: 3600
User-Agent: Paragon Wireless PWTW-1100 1.0.6
SN/000b6c378ad2 aisi/454191234567890
Allow: INVITE, ACK, CANCEL, OPTIONS, BYE, REFER,
NOTIFY
Content-Length: 0
```

Referring to sample message 3, response="SRes" is defined in the SIP REGISTER message to carry the SRes' information. SRes' is the 32-bit response calculated by the SIM Module after running the A3 algorithm together with RAND and the secret key Ki (stored on the SIM) as input, and also encoded using BASE64.

Currently there is no standard to define a method to provide SIM based authentication over SIP. Since the SIP Protocols are designed to be flexible and extensible for future new applications that cannot be foreseen at the moment, to perform the SIM based Authentication over SIP, there are various ways to carry those essential parameters (mainly IMSI, Rand, SRes'), such as by defining new headers, defining new parameters or even defining new message/procedures that also comply with SIP Protocols, which can be implemented in different ways. The above implementation is just one implementation example from the presented invention.

Preferably, the implementation follows the 3 steps:
 a. First, the SIP UA retrieves the IMSI information from the SIM card within the same handset and then the IMSI information is transferred (either transparently or encrypted using any encoding/decoding algorithm) to any intermediary gateway for the gateway to verify with HLR. It is possible that the IMSI is not used at all, as long as the intermediary gateway knows the MSISDN of the SIP UA through the Request-URI or From values in the SIP messages. It can get the IMSI information from the HLR through standard MAP procedures, such as MAP Send-Routing-Information-For-Short-Message, or MAP Send-IMSI.
 b. Second, the intermediary gateway communicates with the HLR through the standard MAP Authentication Procedure, and gets the Rand and CKSN as the challenge from HLR, which is transferred to the SIP UA through SIP messages or other proprietary protocols.
 c. Third, the SIP UA requests the SIM Card to calculate the SRes' using A3 algorithm together with RAND and the secret key Ki (stored on the SIM) as input, and then transfers the SRes' result to the intermediary gateway. The intermediary gateway does a comparison based on the SRes' and SRes, and informs the SIP UA of the authentication result. If successful, the intermediary gateway also performs the location update on behalf of the SIP UA.

AAA-Based Subscriber Authentication and Location Update

Other than SIM-based authentication, for SIP User Agent that is installed on various types of devices that do not contain a GSM based SIM card, the SIP User Agent can use username/password as a credential, which is call AAA-Based Authentication.

Referring now to FIG. 3, a Sequence Diagram for an example message flow of AAA-based Subscriber Authentication and Location Update is shown. The MS SIP UA 165C generates a SIP REGISTER request 310 to the SIP Gateway 111 according to the domain name that is configured in the profile of the handset. The SIP Gateway 111 generates a RADIUS Access-Request and communicates with the HPLMN AAA Server 137. The AAA Server 131 generates a challenge response such as RADIUS Access-Challenge and sends back to the SIP Gateway 111 the SIP Gateway 111 generates a SIP "401 Unauthorized" 316 to the SIP UA in MS.

The MS SIP UA gets the password in the profile or prompts the subscriber to enter the password if it doesn't exist in the profile, and regenerates a SIP REGISTER 318 to the SIP Gateway 111 containing the challenge response. The SIP Gateway 111 communicates with the HPLMN AAA Server 137 again to provide the challenge response in RADIUS Access-Request message 320. Again the AAA Server 137 verifies the challenge response against the challenge result that is stored within the AAA Server 137, and if they are equal, the AAA Server sends the Access-Accept information 322 to the SIP Gateway 111 which in turn generates another SIP REGISTER 324 to inform the IP-VLR 107 of the successful challenge of the SIP UA.

The IP-VLR 107 then performs the Location Update procedure on the HLR using standard MAP procedures. Then the IP-VLR informs the SIP Gateway 111 of the result through SIP "200 OK" 334 or private API. The SIP Gateway 111 relays the SIP "200 OK" 336 to the SIP UA to inform the successful registration result.

Once the authentication and registration is completed, the SIP User Agent can receive/make voice and SMS communications with the same MSISDN in GSM using SIP-based technology. The call flow for setting a call from home into the handset is similar to the standard call flow. However, one important difference from the standard method is that a MSRN (Mobile Station Roaming Number) provided by Virtual MSC/VLR can be either in the same range as the home operator or in a different range, which could be the preferred roaming partner range or provided by the $3^{rd}$ party roaming service provider.

Voice Call (GSM MS to SIP UA)

Figure 4A:
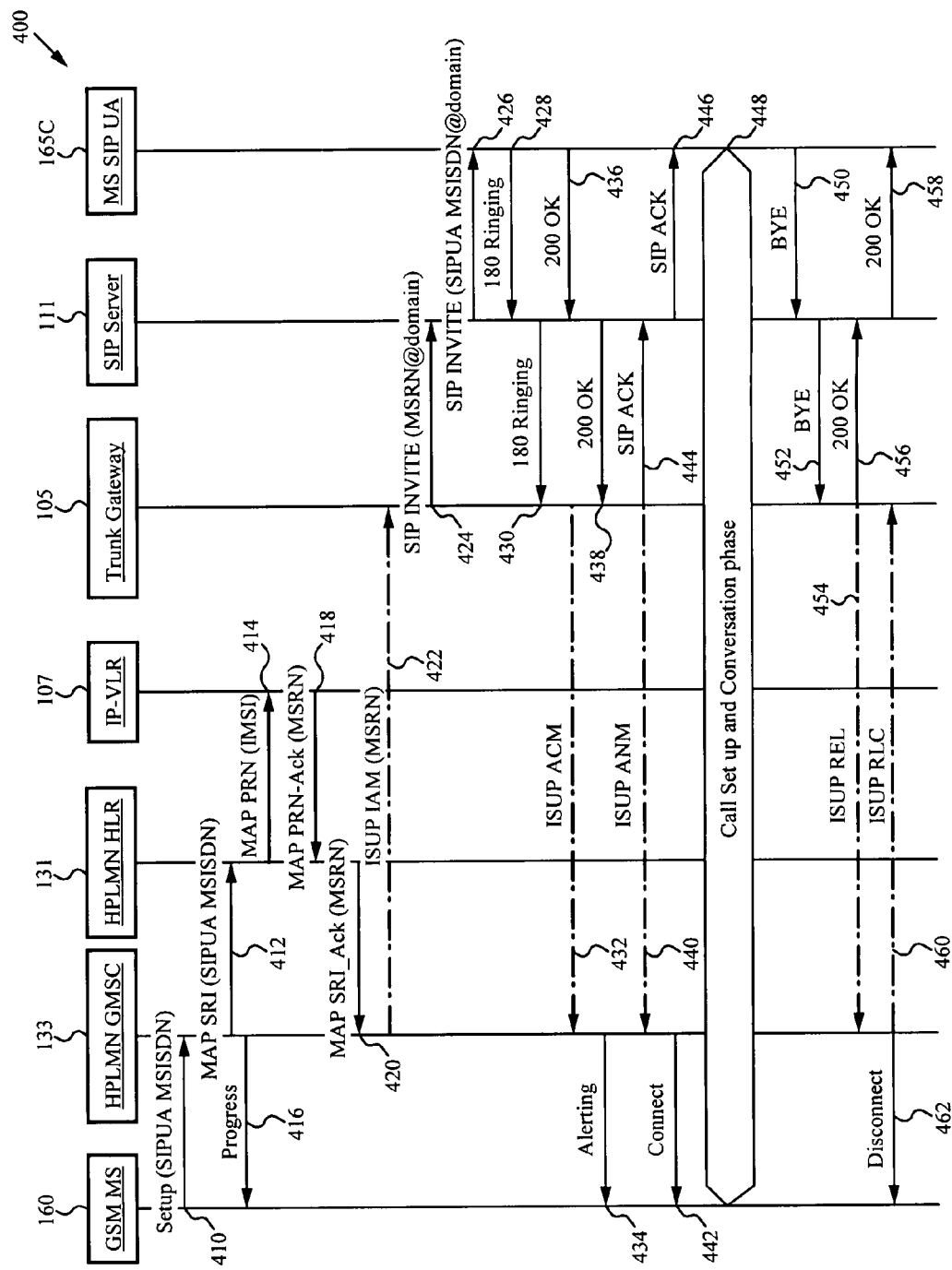
FIG. 4A is a detailed voice call call-flow originating from a GSM Mobile Station (handset) to a terminating dual-mode mobile station registered in IP environment (WiFi or WiMax), in accordance with the present invention.

Referring now to FIG. 4A, a Sequence Diagram for an example message flow of Voice Call from a fixed phone or other mobile phone to the dual-mode mobile station 165 in the WiFi network 156 is shown. When a fixed phone or mobile phone calls the dual-mode mobile station 165 in the WiFi network 156, the Setup (Q.931 protocol) 410 or IAM (ISUP protocol) reaches the HPLMN's GMSC 133. The GMSC 133 gets the callee information, and issues Send-Routing-Information 412 to HLR 131 using the MAP Protocol to query the routing information of the callee. Since the callee is registered in the SIP Gateway 111 and the location information stored in the HLR 131 is the IP-VLR 107, the HLR 131 sends out MAP Provide-Roaming-Number to IP-VLR 107 to query the MSRN from IP-VLR.

The IP-VLR 107 allocates a MSRN for the IMSI, stores the new MSRN-IMSI mapping information, and returns the MSRN to HLR in the MAP PRN Ack message. The HLR 131 then returns the MSRN to the GMSC 133 in the MAP SRI Ack message 420.

The GMSC 133 then initializes an ISUP Message IAM 422 to the Trunk Gateway 105, containing the MSRN information. The Trunk Gateway 105 then converts the ISUP message into a SIP INVITE message 424, and transfers it to the SIP Gateway 111.

Based on the originally stored MSRN-IMSI-MSISDN mapping information, the SIP Gateway 111 is able to convert the MSRN into MSISDN, get the registry information of the MS SIP UA that is using the MSISDN, and relay the INVITE message 426 to the correct IP:Port of the MS SIP UA.

The SIP UA rings to the subscriber to indicate an incoming call, and at the same time generates a SIP "180 Ringing" 428 to the SIP Gateway 111 which is relayed to the Trunk Gateway 105. The Trunk Gateway 105 converts the SIP "180 Ringing" into an ISUP ACM message 432 and relays it to the GMSC 133. The GMSC 133 relays to or converts the ISUP ACM into a Q.931 Alert 434 and relays that to the caller.

When the Callee answers the call, the SIP UA generates another "200 OK" 436 to the SIP Gateway 111 which is then relayed to the Trunk Gateway 105. The Trunk Gateway 105 converts the SIP "200 OK" into an ISUP ANM 440 message, relays it to the GMSC 133, and at the same time, generates a SIP ACK message 444 to the SIP Gateway 111 according to the SIP protocol. The GMSC relays to or converts the ISUP ANM into a Q.931 Connect 442 and relays that to the caller. Then the voice call is setup, and the two parties are able to talk to and hear each other.

Either party can shutdown the voice call. If the Callee shutdowns the call, the SIP UA generates a SIP BYE 450 to the SIP Gateway 111 which is then relayed to the Trunk Gateway 105. The Trunk Gateway 105 converts the SIP BYE into an ISUP REL message 454, relays to the GMSC 133, and at the same time, generates a SIP "200 OK" response message 456 to the SIP Gateway 111 according to the SIP protocol.

The GMSC 133 relays to or converts the ISUP REL message into a Q.931 Disconnect 462 and relays that the caller, and then generates the ISUP RLC 460 to the Trunk Gateway.

Voice Call (SIP UA to GSM MS)

Figure 4B:
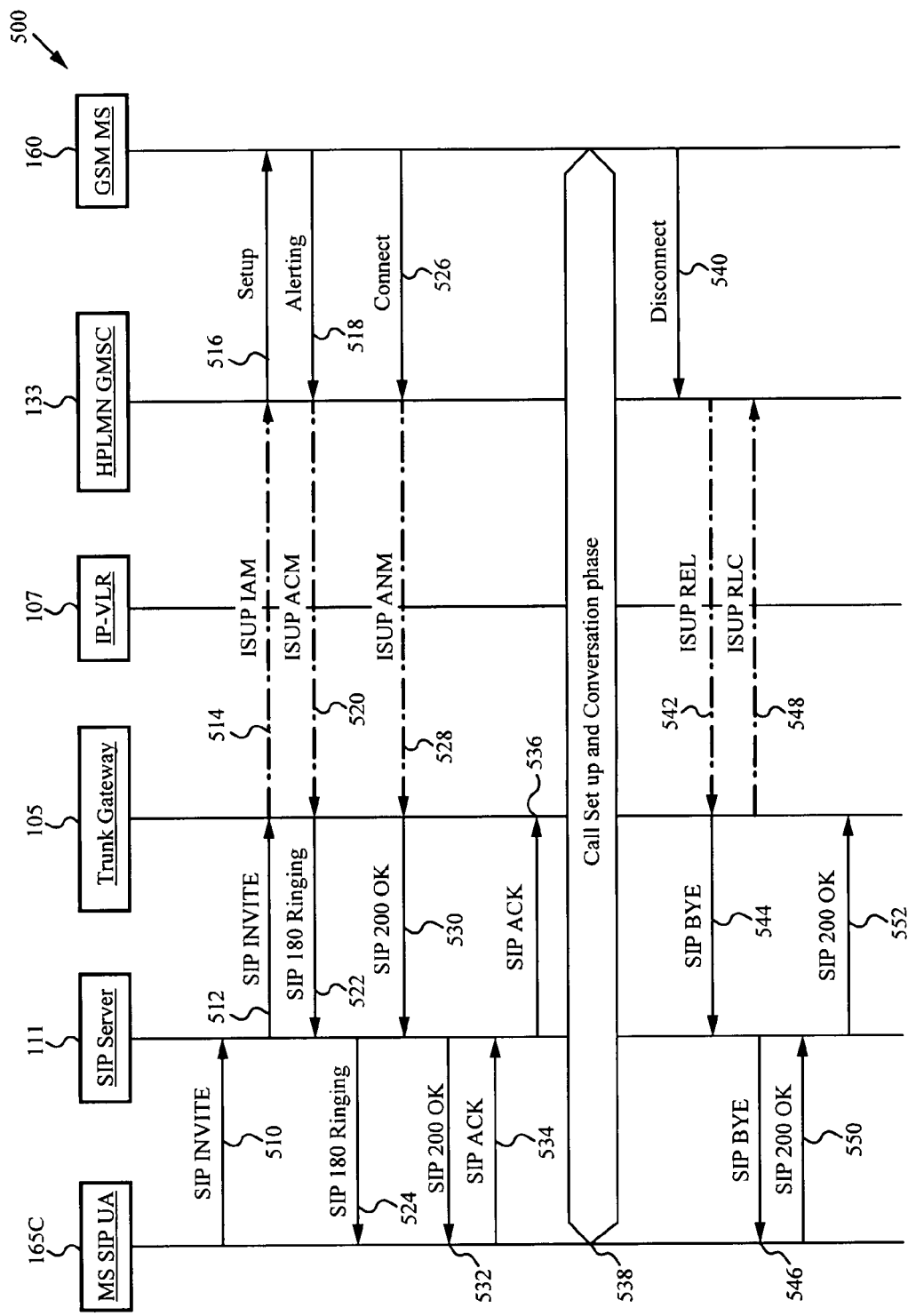
FIG. 4B is a detailed voice call call-flow originated from the dual-mode mobile station (in WiFi or WiMax environ) to a GSM Mobile Phone or PSTN Fixed Phone, in accordance with the present invention.

Referring now to FIG. 4B, a Sequence Diagram for an example message flow of Voice Call from dual-mode mobile station (in WiFi or WiMax environ) to a fixed phone or other GSM mobile phone is shown. When the dual-mode mobile station 165 under a WiFi network environment initials an outgoing call, the SIP UA in the dual-mode mobile station 165 sends out a SIP INVITE message 510 to the SIP Gateway 111. The SIP Gateway 111 performs a dial-plan analysis and determines from the destination of the call that the call should go through the Trunk Gateway 105. The SIP Gateway 111 thus relays the SIP INVITE 512 to the Trunk Gateway 105.

The Trunk Gateway 105 converts the SIP INVITE to ISUP IAM 514 and sends it out to the HPLMN's GMSC 133, which can also be switches in PSTN network if the call is to PSTN fixed phone.

The GMSC 133 converts the ISUP IAM into a Q.931 Setup message in the step 516 and sends it to the GSM MS 160. The GSM MS 160 rings to indicate an incoming call to the user, and generates an Alerting message 518 to the GMSC 133. The GMSC 133 converts the Alerting message into an ISUP ACM 520 and relays it to the Trunk Gateway 105. The Trunk Gateway 105 converts the ISUP ACM into SIP 180 Ringing message in the step 522 and relays the message to the SIP Gateway 111, which relays the message to the MS SIP UA; thus the caller can hear the ring.

When the callee answers the call, the GSM MS 160 will send out a Connect 526 to the GMSC 133, which is converted into an ISUP ANM 528 and relays to the Trunk Gateway 105. Then the Trunk Gateway 105 converts the ISUP ANM into a SIP 200 Ok 530 and relays that to the SIP Gateway 111. The message is further relayed to the MS SIP UA to indicate the callee answered the call. The SIP UA sends back a SIP ACK 534 to finish the SIP INVITE Transaction according to the SIP Protocol, which is relayed to the SIP Gateway 111 and then to the Trunk Gateway 105. The voice call is setup, and the two parties are able to talk to and hear each other.

Either party can shutdown the voice call. If the callee shutdowns the call, the GSM MS 160 generates a Disconnect 540 to the GMSC 133. The GMSC 133 converts the Disconnect into ISUP REL message in the step 542 and relays to the Trunk Gateway 105, which converts the message into SIP BYE 544 and relays the message to the SIP Gateway 111. The Trunk Gateway 105 also generates an ISUP RLC 548 to the GMSC 133. The SIP Gateway 111 relays the SIP BYE 544 to the SIP UA. The SIP UA acknowledges and sends back SIP "200 OK" 550 to the SIP Gateway 111. The SIP Gateway 111 relays the 200 Ok to the Trunk Gateway 105, thus the voice call is successfully shutdown.

Dual-Direction SMS

There are two ways to support SMS between GSM MS and SIP UA via the IP-VLR for SMS originated from the dual mode mobile station, which means that IP-VLR can be deployed with two options.

Under Option 1, the IP-VLR functions as a visited MSC/VLR. When a SMS message received from SIP UA, the IP-VLR converts the SMS from the SIP message into a MAP message and uses the SMS Submission process MAP MO-FSM to submit the message to a home SMSC for SMS delivery via SS7, in which the home SMSC would take the responsibility to store and delivery the short message to the recipient.

Under Option 2, the IP-VLR is deployed as a home SMSC and SMS-GMSC, which use the MAP MT-FSM procedure to directly deliver to the recipient without the involvement of the HPLMN SMSC. The IP-VLR converts the SMS from the SIP message into a MAP message and uses MAP SRI-For-SM message to query the location of recipient, and then use the MAP MT-FSM to terminate the SMS to the recipient.

Option 1: (Submission Process)

Referring to FIG. 5A, a Sequence Diagram for an example message flow of an SMS Mobile originated message from a dual-mode mobile station to GSM (or CDMA) MS using MO-FSM to submit to HPLMN's SMSC is shown.

The SIP UA submits a short message to the SIP Gateway 111 by using SIP MESSAGE 610, and the SIP Gateway 111 proxies the message to the IP-VLR 107. Upon receiving the short message, the IP-VLR extracts the SMS message to get the originating number, recipient number and the short message, then fetches HPLMN IWMSC 170 Global Title from its local mapping table and then forwards the extracted short message with the MSISDN to the SMS-IWMSC 170 using standard MAP message MO-FSM 614 exactly as if it is an Visited MSC in the GSM network. The SMS-IWMSC 170 transfers the SMS message 616 to the SM-SC 171. The SM-SC sends a submit report 618 to SMS-IWMSC 170, which is then converted into a MAP MO-FSM Ack and relayed to the IP-VLR. Then the IP-VLR converts the MO-FSM Ack into a SIP "200 OK" 628 and sends the response to the SIP Gateway 111. The SIP Gateway 111 relays the SIP "200 OK" 630 to the SIP UA to indicate the successful delivery of the Short message.

Option 2: (Termination Process)

Referring to FIG. 5B, a Sequence Diagram for an example message flow of SMS Mobile Originated from a dual-mode mobile station to a GSM/CDMA MS using MAP MT-FSM procedure to directly deliver to the recipient without the involvement of the HPLMN SMSC is shown.

The SIP UA submits short message to SIP Gateway 111 by using a SIP MESSAGE 710, and SIP Gateway 111 relays the message 712 to the IP-VLR. Upon receipt the SIP message, the IP-VLR extracts the originating number, recipient number and the short message, and then generates a MAP SRI-For-SM 714 directly to the recipient's HLR 175. The recipient can be the same operator as the sender, or can belong to another operator that is different from the home operator. Upon receipt of the SRI-For-SM, the recipient HLR 175 checks the roaming relationship with the IP-VLR. If the relationship is an allowable one, the HLR 175 returns the MAP SRI-For-SM-Ack 716 to the IP-VLR with the IMSI and the visited MSC address that the recipient is currently located.

The IP-VLR 107 then sends the extracted short message to the VMSC using MAP MT-FSM 718, in which a conversion from a different charset into a GSM format charset is used in the IP-VLR. Upon receiving the MT-FSM, the VMSC pages the recipient and transfers the short message to the handset, as is shown in the step 720, and generates an acknowledge message 722 to the IP-VLR if the transfer succeeds. Then IP-VLR generates the SIP 200 Ok 724 based on the MT-FSM-Ack. The SIP Gateway 111 relays the SIP "200 OK" 726 to the SIP UA to indicate the successful delivery of the Short message.

Embodiments of the present invention also enable the SMS termination to the SIP User Agent that is roaming in WiFi environment, which messages maybe originated from GSM network, CDMA network or other networks with the recipient MSISDN is the SIP User Agent's identification.

Figure 6:
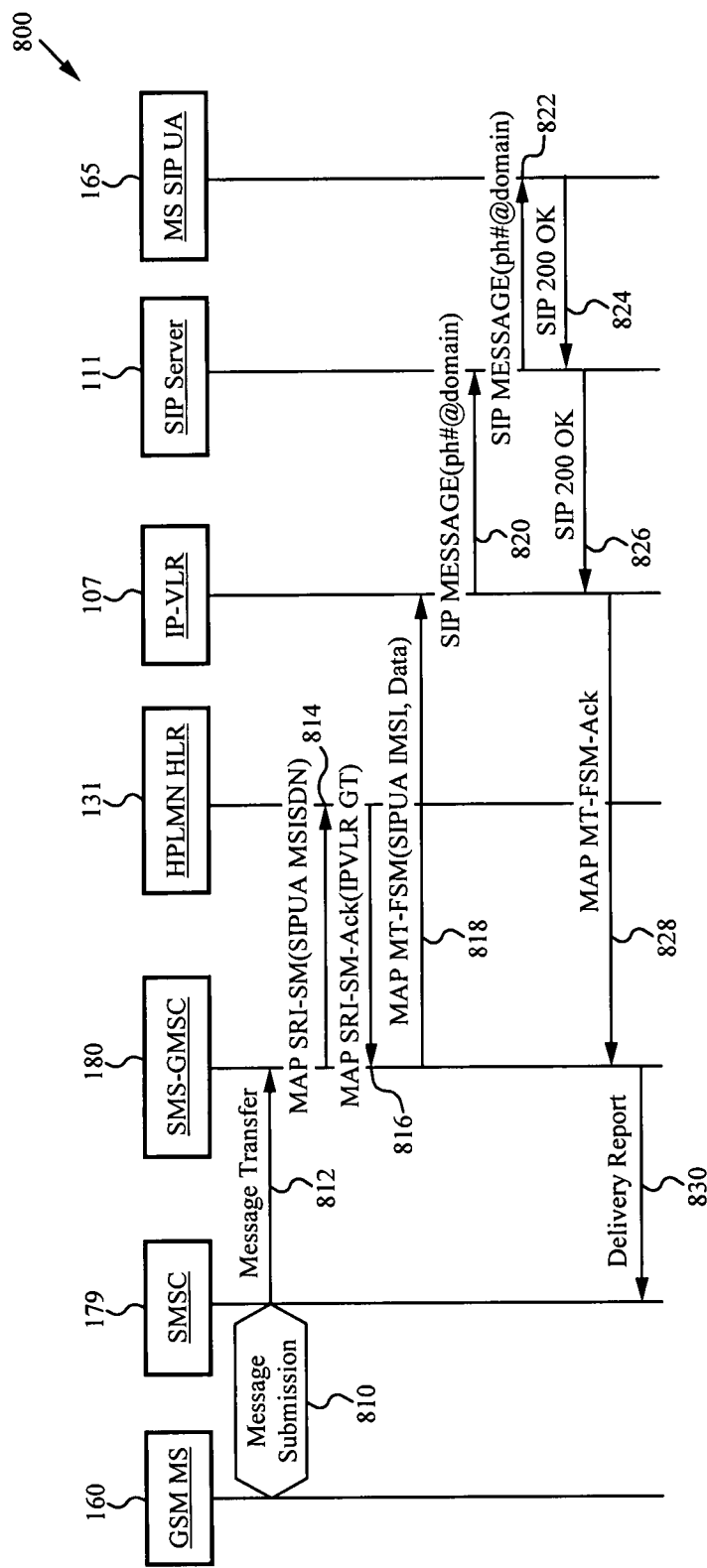
FIG. 6 is a detailed call-flow for a SMS message originating from a GSM Mobile Station to a dual-mode mobile station in an IP mode, in accordance with the present invention.

Referring to FIG. 6, a Sequence Diagram for an example message flow of SMS Mobile Terminated to the dual-mode mobile station under WiFi or WiMax environment is shown.

The SM-SC 179 forwards the short message 812 to the SMS-GMSC 180. The SMS-GMSC sends a MAP SRI-For-SM 814 to the HLR 131 that contains the recipient subscriber's location information. The HLR 131 returns to the SMS-GMSC 180 with the IMSI and visited MSC that the recipient is currently located, which is the IP-VLR 107 address. The SMS-GMSC 180 then sends the MAP MT-FSM 818 to the IP-VLR 107, which contains the short message and IMSI information. The IP-VLR 107 then fetches the IMSI and data from the MAP message, converts them into a SIP MESSAGE 820, and sends it to SIP Gateway 111. A local database is used at the IP-VLR to get the recipient MSISDN based on the IMSI. And character conversion is also done at the IP-VLR to convert the GSM format charset into readable charset in the SIP UA, such as ASCII or UTF-8. The SIP Gateway 111 relays the SIP MESSAGE 822 to the SIP UA, and the SIP UA responds with a SIP "200 OK" 824 once it successfully decodes and displays the short message to the subscriber. The IP-VLR sends a delivery report 828 back to the SMS-GMSC 180 based on the response from the SIP Gateway 111 which in turn sends a delivery report to the SM-SC 179.

CAP Capability

In order to facilitate HPLMN's billing system with Intelligent Network deployment, embodiments of the present invention also include the CAP protocol to connect with HPLMN's gsmSCF/SCP, in which the IP-VLR acts as standard gsmSSF/SSP defined in 3GPP specification TS 23.078. The CAP protocol is implemented on the IP-VLR (it can also be implemented in a separated module, but to keep the system compact enough, preferably the CAP interface is implemented within the IP-VLR, and the IP-VLR acts as the following 3 roles: Virtual MSC, Virtual VLR, Virtual SSP/gsmSSF), thus there should be some way for the SIP Gateway 111 and IP-VLR to keep in sync on the call setup and disconnection, to trigger the correct billing procedure. One embodiment uses a proprietary TCP protocol between the SIP Gateway 111 and the IP-VLR. The Protocol contains at least (but not limited to) 5 message flows: Invite, Accept, Hungup, Release and KeepAlive.

SIP User to PSTN Phone or Mobile Phone with CAP Protocol

Figure 7:
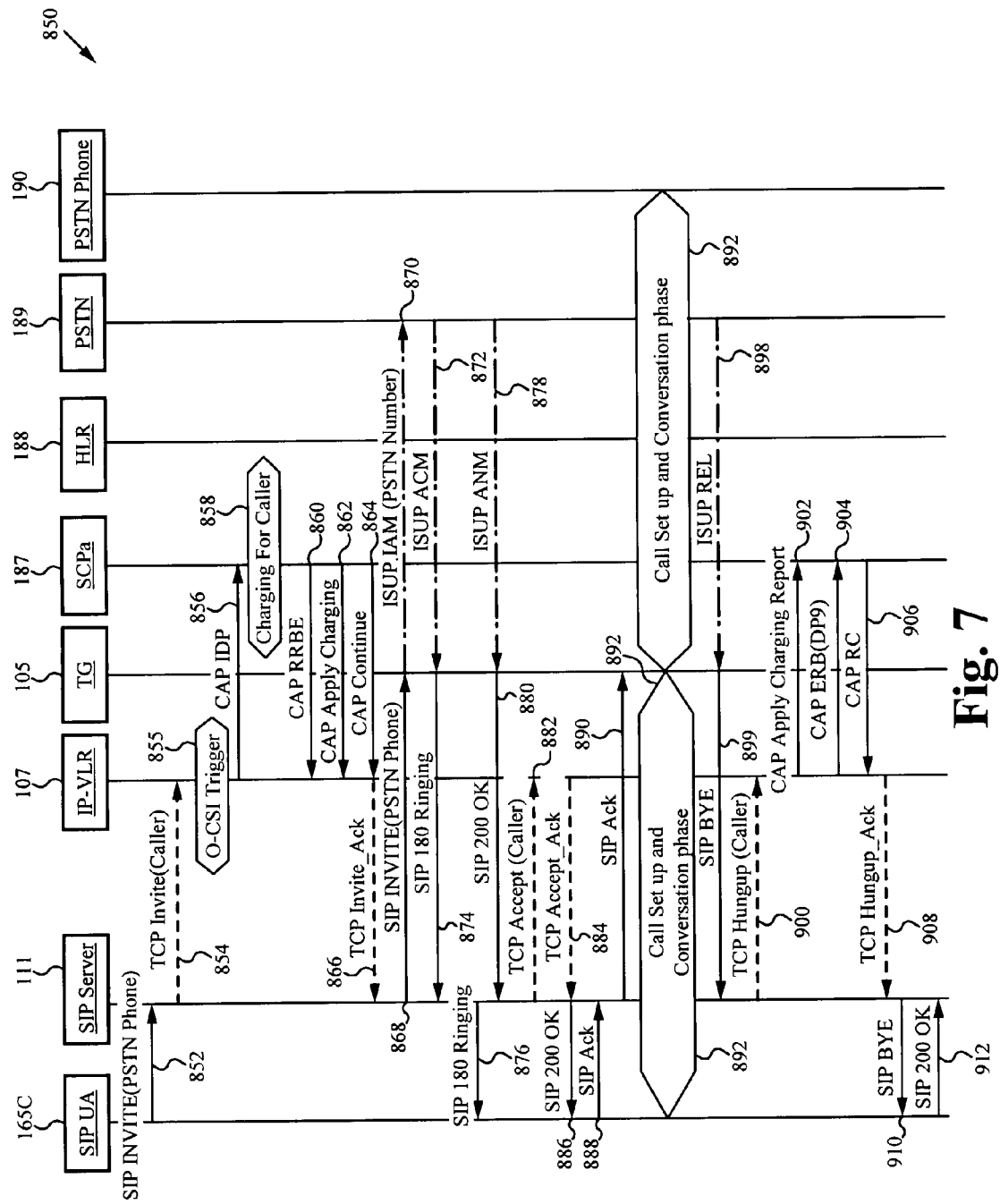
FIG. 7 is a detailed call-flow for a voice call originating from a dual-mode mobile station in IP mode to a terminating regular PSTN Phone or regular Mobile Station with the CAP protocol, in accordance with the present invention.

Referring now to FIG. 7, a Sequence Diagram for an example message flow of Voice call from a SIP User to a PSTN Phone or Mobile Phone with CAP Protocol is shown.

When the SIP INVITE message 852 arrives at the SIP Gateway 111 indicating that the SIP User Agent has requested to set up a voice call, the SIP Gateway 111 generates a TCP Invite 854 to the IP-VLR 107. The IP-VLR 107 then examines the TCP MSGI and checks if O-CSI exists for the calling party, and acts as gsmSSF to trigger the CAP flow to the correct SCP/gsmSCF, such as SCPa 187. The O-CSI information is collected and stored by the IP-VLR 107 during the Authentication Procedure. After the SCPa 187 successfully handles the CAP flow, the IP-VLR 107 takes some actions based on the instructions received from the gsmSCF on how the call is to be routed, and then TCP Invite_Ack 866 is sent back in the same TCP connection to the SIP Gateway 111. Then SIP Gateway 111 forwards the SIP INVITE message 868 to the Trunk Gateway 105. A response SIP "200 OK" indicates that the destination has accepted the session invitation. Thus SIP Gateway 111 will send TCP Accept 882 to the IP-VLR to inform IP-VLR of the successful call setup, and IP-VLR will record the timestamp as the start billing event.

After successfully handling the TCP Accept, the IP-VLR sends back TCP Accept Ack 884 to indicate the handling result to the SIP Gateway 111. Either party may release the call with a BYE method. On receipt of the BYE, the SIP Gateway 111 sends a TCP Hungup 900 to the IP-VLR to indicate the shutdown of an ongoing call. On successfully handling the TCP Hungup, IP-VLR will trigger the CAP flow to SCPa 187 to report the Disconnection event. After the SCPa 187 processes the CAP flow and finishes the billing for this call, it sends a CAP RC (Release Complete) 906 to the IP-VLR, which generates a TCP Hungup_Ack 908 to the SIP Gateway 111.

Those skilled in the art will recognize that the signaling messages between PSTN 189 and PSTN Phone 190 are missed, actually the signaling messages are quite common, and those skilled in the art should know that the signaling protocol could be ISUP, TUP or Q.931. and PSTN 189 and PSTN Phone 190 could also denote more general ones, thus the PSTN could be also GSM network, CDMA network, or etc. and the PSTN Phone could be GSM Phone, CDMA Phone or other mobile station.

Figure 8:
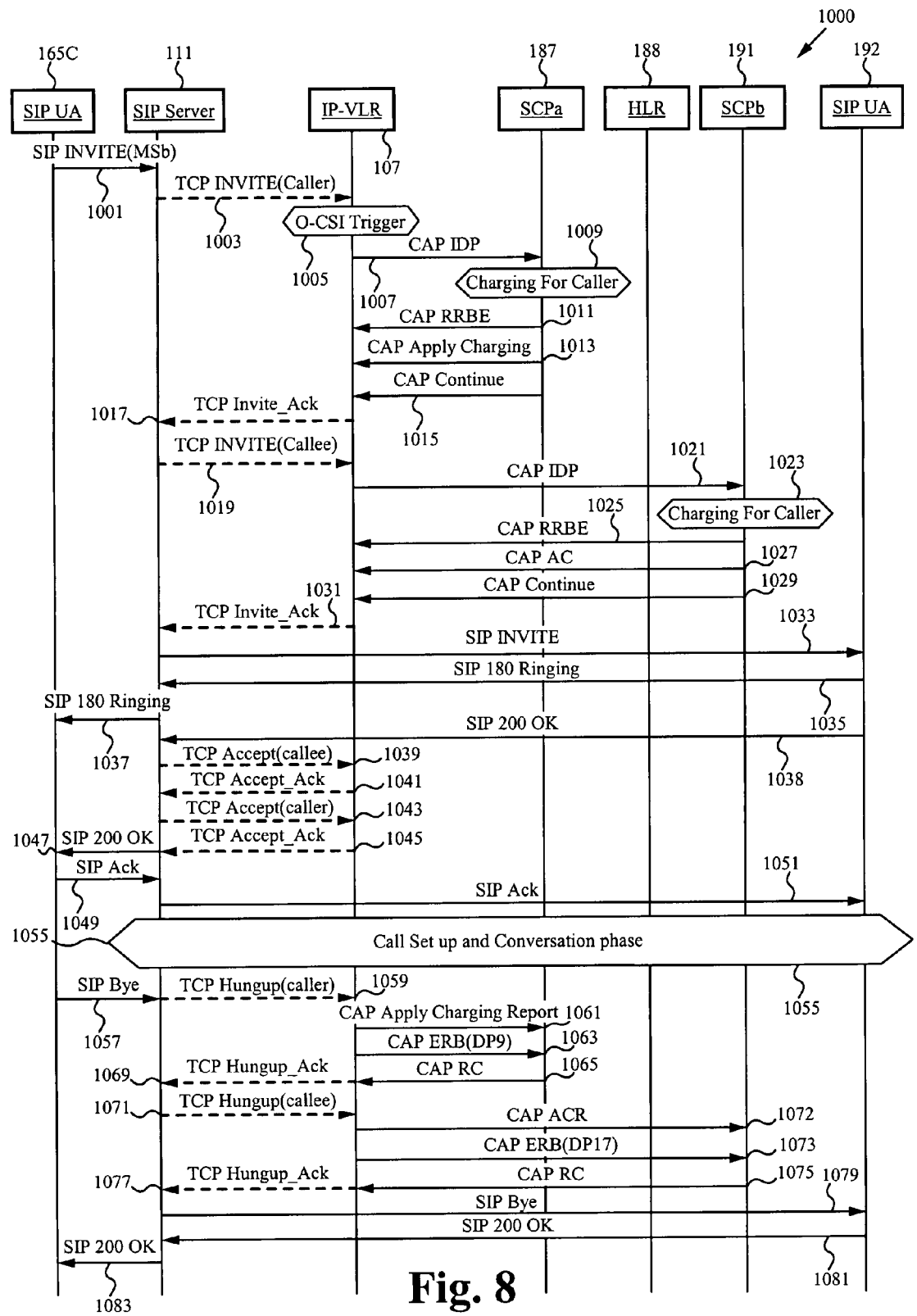
FIG. 8 is a detailed call-flow for a voice call from a dual-mode mobile station to a dual-mode mobile station (both are in IP mode) with the CAP protocol, in accordance with the present invention.

FIG. 8 shows a more complicated message flow when both the calling and called party are all registered under a WiFi environment, in which CAP messages should be triggered twice, once to trigger the billing for calling party, the other for the called party. To achieve consistency with a previous message, the TCP interface is able to take "CallPartyType" as the parameter for all messages, and trigger twice with different values, in which at the first trigger time the parameter is set to value Caller, and at the second trigger time the parameter is set to the value Callee. Thus the IP-VLR is able to do different actions based on the different trigger values and events.

In addition, the solution can also be applied for each individual operator. In this case, each individual operator can install Virtual MSC/VLR and SIP Gateway 111 specified in this document.

It will be readily apparent to one skilled in the art that modifications may be made to the embodiments without departing from the spirit and scope of the invention as defined by the appended claims.

We claim:

1. A method of registering a mobile device to use a visiting network comprising:
- translating first registration messages from the mobile device from a first protocol to corresponding second registration messages in a second protocol, wherein translating the first registration messages into the second registration messages are performed at an Internet Protocol Visitor Location Register (IP-VLR) belonging to an IP network containing a roaming service platform, wherein the IP network is configured to communicatively couple with the PSTN through a gateway belonging to the IP network and with a HPLMN and the Internet via a firewall belonging to the IP network; and
- transmitting the second registration messages to register the device to use the visiting network;
- translating response messages in the second protocol to corresponding response messages in the first protocol; and
- transmitting the corresponding response messages in the first protocol to the mobile device.

2. The method of claim 1, wherein the first protocol is Session Initiation Protocol.

3. The method of claim 1, wherein the second protocol is a global wireless protocol.

4. The method of claim 3, wherein the global wireless protocol is Mobile Application Part (MAP).

5. The method of claim 1, further comprising retrieving from the mobile device an International Mobile Station Identity (IMSI) and transmitting the IMSI in the first registration messages.

6. The method of claim 1, further comprising authenticating the mobile device through a Home Public Land Mobile Network (HPLMN) Home Location Register (HLR) using the second protocol.

7. The method of claim 6, further comprising exchanging authentication and location information for the mobile device between the HPLMN HLR and the IP-VLR.

8. The method of claim 1, further comprising authenticating the mobile device using an authentication sequence with a proxy server using a third protocol.

9. The method of claim 8, further comprising retrieving an authentication sequence from the mobile device.

10. The method of claim 9, wherein the third protocol is Remote Authentication Dial-In User Service (RADIUS).

11. The method of claim 1, further comprising sending a Short Message Service Message from the mobile device to a destination device.

12. A method of registering a dual-mode mobile station having a WiFi and a GSM interface to use a visiting network comprises:
- a. retrieving an International Mobile Station Identity (IMSI) from a SIM in the dual-mode mobile station having a SIM-based Session Initiation Protocol (SIP) User Agent;
- b. transmitting the IMSI in a first registration message in SIP to a SIP Server coupled to an Internet Protocol Visitor Location Register (IP-VLR);
- c. translating the first registration message in SIP to a second corresponding registration message in a global wireless protocol, Mobile Application Part (MAP);
- d. transmitting the second registration message in MAP to a Home Public Land Mobile Network (HPLMN) Home Location Register (HLR);
- e. transmitting a first response message in MAP, from the HPLMN HLR to the IP-VLR;
- f. translating the first response message in MAP to a second corresponding response message in SIP at the IP-VLR; and
- g. transmitting the second corresponding response message in SIP to the dual-mode mobile station where it is received and processed by the SIM-based SIP User Agent,
- thereby registering the dual-mode mobile station to use a visiting network.

13. The method of claim 12, wherein translating the first registration message into the second registration message is performed at the IP-VLR.

14. The method of claim 13, further comprising exchanging authentication and location information for the mobile device between the HPLMN HLR and the IP-VLR.

15. The method of claim 12, further comprising authenticating the mobile device using an authentication sequence with a proxy server using a third protocol.

16. The method of claim 15, further comprising retrieving an authentication sequence from the mobile device.

17. The method of claim 16, wherein the third protocol is Remote Authentication Dial-In User Service (RADIUS).

* * * * *